United States Patent [19]
Barba et al.

[11] 3,933,597
[45] Jan. 20, 1976

[54] MULTISTAGE FLASH EVAPORATOR FOR PRODUCING SOFT WATER FROM A SALINE WATER

[75] Inventors: Diego Barba; Antonino Germana; Giuseppe Liuzzo; Giovanni Tagliaferri; Giancarlo Spizzichino, all of Rome, Italy

[73] Assignee: Societa' Italiana Resine S.p.A., Milan, Italy

[22] Filed: Dec. 18, 1974

[21] Appl. No.: 533,805

[52] U.S. Cl. ............... 202/173; 203/11; 159/2 MS
[51] Int. Cl.² .................... B01D 3/02; B01D 3/10
[58] Field of Search ........ 159/17 C, 2 MS; 202/173; 203/11

[56] References Cited
UNITED STATES PATENTS

| | | | |
|---|---|---|---|
| 2,782,150 | 2/1957 | Staleup | 203/11 X |
| 3,186,924 | 6/1965 | Williamson | 202/173 |
| 3,192,132 | 6/1965 | Loebel | 202/173 |
| 3,197,387 | 7/1965 | Lawrance | 202/173 |
| 3,488,260 | 6/1970 | Gilbert | 202/173 X |
| 3,551,298 | 12/1970 | Lichtenstein | 202/173 |
| 3,684,661 | 8/1972 | Barba et al. | 159/2 MS |
| 3,763,014 | 10/1973 | Barba et al. | 202/173 |

FOREIGN PATENTS OR APPLICATIONS

| | | | |
|---|---|---|---|
| 855,550 | 12/1960 | United Kingdom | 159/2 MS |

Primary Examiner—Jack Sofer
Attorney, Agent, or Firm—Holman & Stern

[57] ABSTRACT

A multistage flash-evaporator for producing soft water from a saline water, comprising a shell forming a pair of lobes enclosing therebetween a spinal portion in symmetrical arrangement with respect to a vertical longitudinal mid-plane. The top and bottom walls of the spinal portion are, in cross-sectional shape, circular arcs having their centres of curvature on the said mid-plane, while the lobes are polycentric curves each of which has its centres of curvature on a plane parallel to the mid-plane. A specifically shaped hood arrangement in the shell is provided to define in each stage a condensation chamber centrally located between a pair of evaporation chambers.

9 Claims, 4 Drawing Figures

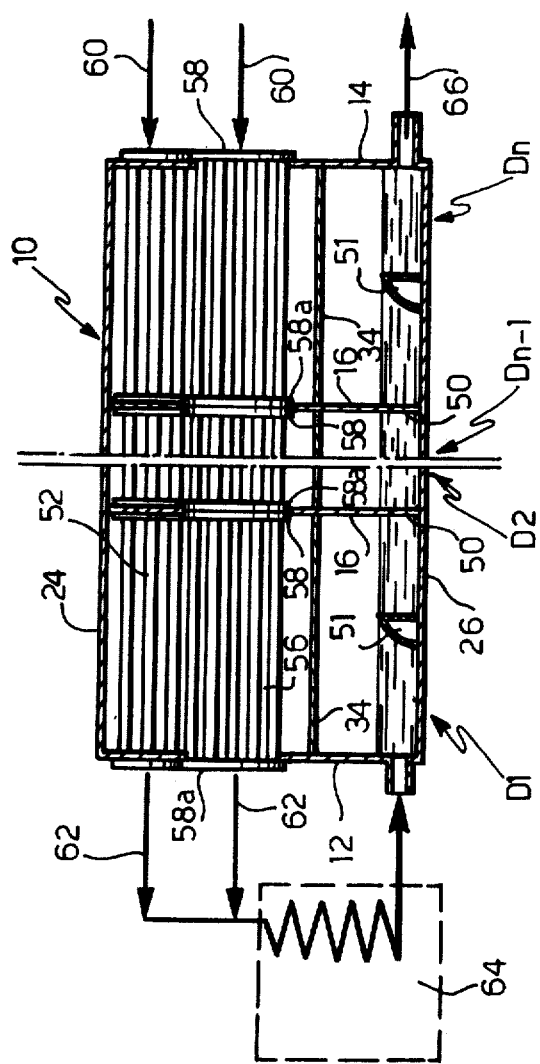

MULTISTAGE FLASH EVAPORATOR FOR PRODUCING SOFT WATER FROM A SALINE WATER

This invention relates to a multistage flash-evaporator for producing soft water from a saline water (e.g. sea water or brackish water).

The class of evaporators to which the invention relates may be defined as comprising: a horizontal, uninterrupted rectilinear tubular shell having a pair of transverse end walls; a plurality of longitudinally spaced transverse partition walls in the shell subdividing the inside of the latter into a series of consecutive distilling units; a longitudinally extending hood in each unit subdividing the inside of the unit into an evaporation chamber and a condensation chamber, said longitudinally extending hood including a filtering zone pervious to steam through which the evaporation chamber communicates with its associated condensation chamber in the unit; normally submerged passages in each partition wall allowing a continuous flow of saline water through the evaporation chambers in the consecutive units; and a condenser in each unit comprising a rectilinear bundle of heat exchange tubes extending longitudinally in the condensation chamber; the cross-sectional shape of both the said shell and chambers being constant throughout the length of the shell and symmetrical with respect to a vertical longitudinal mid-plane of the evaporator, and the condensers in the distillation units being serially connected therebetween.

In operation, the crude saline water is continuously supplied to the condenser in one end unit of the evaporator to provide a coolant flowing in the condenser tubes throughout the whole length of the evaporator. The crude saline water discharged from the condenser in the opposite end unit is then heated to a suitable temperature (generally from about 90°C to about 120°C) and is delivered to the evaporating chamber in the last named unit from which it flows through all the units. The units operate at absolute pressure values decreasing in the direction of flow of the saline water and the steam flashing out from the saline water in each unit is condensed on the tubes of the condenser in the unit. The condensate dripping from the tubes is collected and provides the desired soft water.

Depending upon the number of stages, the overall length of the evaporator may be as small as about 30 metres but frequently exceeds 100 m. From the mechanical point of view, the evaporator is a continuous hollow beam (girder) lying on a series of longitudinally spaced supporting structures. Economically, it is important that the evaporator be of a lightweight structure and yet mechanically strong. Moreover, its daily production of soft water should be high and the residual salinity of the product (as ascertained by measuring the electric conductance of the condensate, expressed e.g. in micro-Siemens/cm) should be extremely low. Multistage flash-evaporators installed to date in a great number of localities all over the world are far from satisfying simultaneously all the requisites pointed out above. It is therefore an object of this invention to substantially mitigate this drawback.

Accordingly, the invention provides a multistage flash-evaporator as defined hereinbefore, which is characterized in that:

a — the shell forms a pair of lobes at opposite sides of said longitudinal mid-plane enclosing therebetween a spinal portion defined by an upwardly arched top wall and a downwardly arched bottom wall;

b — the cross-sectional shape of both said top wall and said bottom wall is a circular arc having its centre of curvature on the said mid-plane;

c — the cross-sectional shape of each of said lobes consists of a continuous polycentric curve which is concave towards the spinal portion and is connected by its branches to the respective circular arcs mentioned at (a);

d — a pair of longitudinally extending hoods is provided in each distillation unit at opposite sides of said mid-plane, each of the hoods comprising a roof wall which includes the aforementioned filtering zone and is located in its corresponding lobe and in an adjacent part of the spinal portion of the shell, and a side wall connecting the roof wall to the bottom wall of the spinal portion in an arrangement wherein the side walls of the hoods form therebetween a distillate-collecting channel extending longitudinally of the distilling unit between a pair of evaporating chambers underlying their respective hoods;

e — The normally submerged passages in each of the partition walls are located in regions surrounded by the respective lobes of the shell.

According to a preferred embodiment, each of the polycentric curves mentioned at (c) consists of three segments having their centres of curvature located on a vertical plane parallel to the said mid-plane, and the curvature of the top wall of the spinal portion is greater than the curvature of the bottom wall of said portion. Still preferably the radii of curvature of the two lobal segments (upper and lower lobal curves) of each of the polycentric curves are substantially equal to each other; the ratio of each of these radii to the radius of curvature of the terminal segment of the curve is from 2:1 to 2.5:1; the radius of curvature of the bottom wall of the spinal portion is at least 4 times as great as the radius of curvature of the top wall of the spinal portion while the latter radius is substantially equal to the radii of curvature of said two terminal segments.

According to a highly advantageous aspect, the angle subtended by the said central segment is substantially 180°; the angle subtended by each of the said terminal segments is from about 15° to about 20°; the angle subtended by the top wall of the spinal portion is from about 40° to about 45°; and the angle subtended by the bottom wall of the spinal portion is from about 15° to about 20°.

Preferably, the roof wall in each of the hoods merges with the respective side wall of the hood through an arcuate wall portion, and the roof wall portion including the filtering zone slopes towards its corresponding lateral side of the evaporator at an angle of 2°–3°. Also, preferably, the said roof wall comprises an upper step including said filtering zone, and a lower step which merges with said side wall and slopes towards the latter at an angle of at least 2°–3°.

In the accompanying drawings

FIG. 4 is a schematic longitudinal cross-sectional view of the evaporator on line IV—IV of FIG. 2;

FIG. 5 is a detail of FIG. 2.

Figure 1:
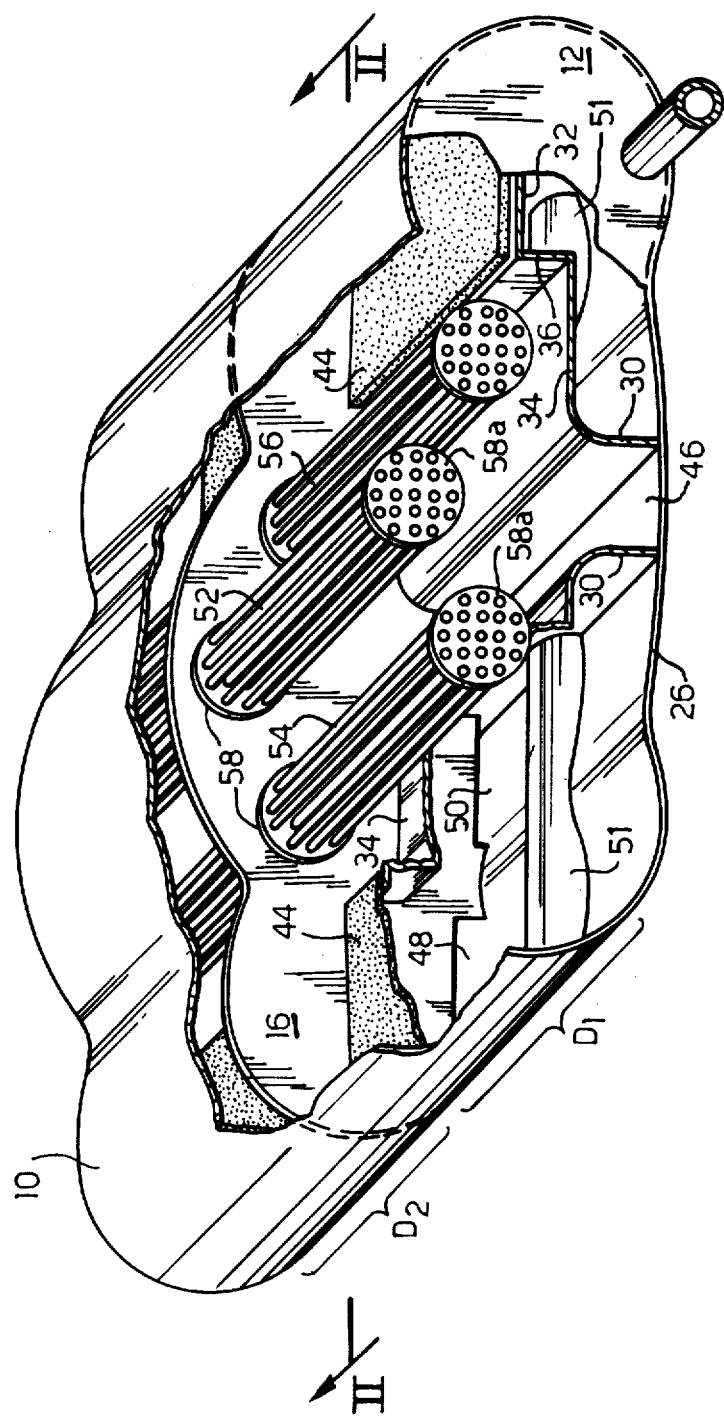
FIG. 1 is a perspective, partly broken view of a length of an evaporator according to the invention.

Referring to the drawings, the evaporator comprises a horizontal, uninterrupted, rectilinear tubular shell 10 of sheet steel having a pair of transverse end walls 12, 14 (FIG. 4). A plurality of longitudinally spaced transverse partition walls 16 sealingly welded to the shell subdivides the inside of the latter into a series of consecutive distilling units D1, D2, . . . Dn-1, Dn. The transverse cross-sectional shape of the shell 10 is constant throughout its length. Also, the parts internally equipping a distillation unit are exactly similar to the corresponding parts in all other units.

Figure 2:
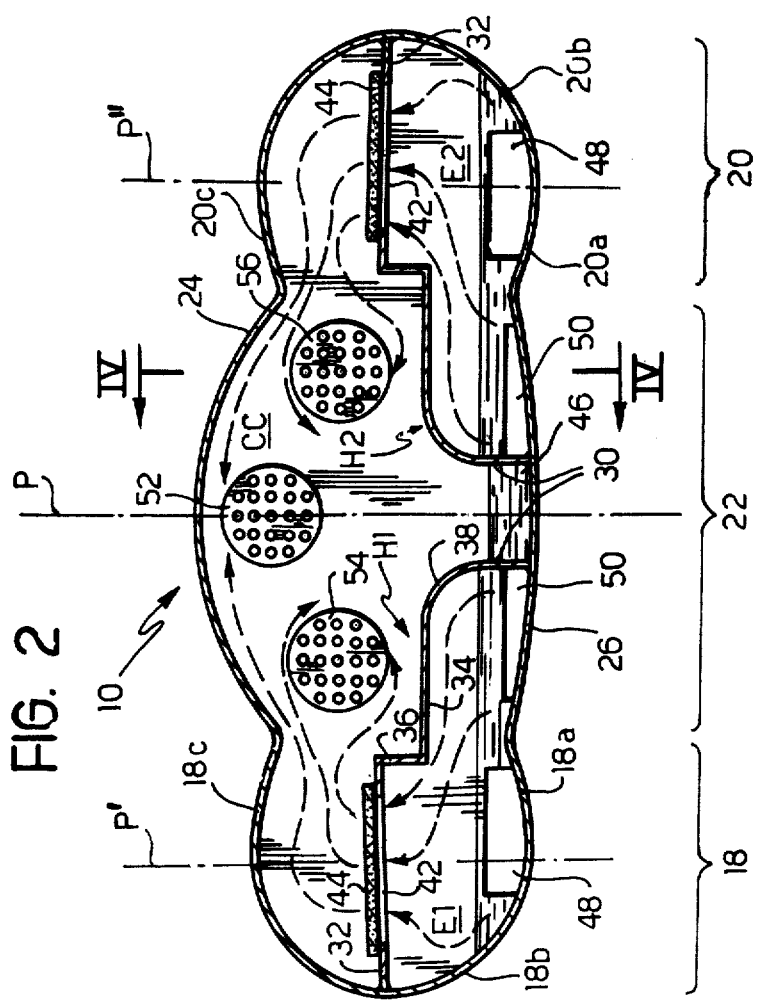
FIG. 2 is a cross-sectional view on line II—II of FIG. 1.
Figure 3:
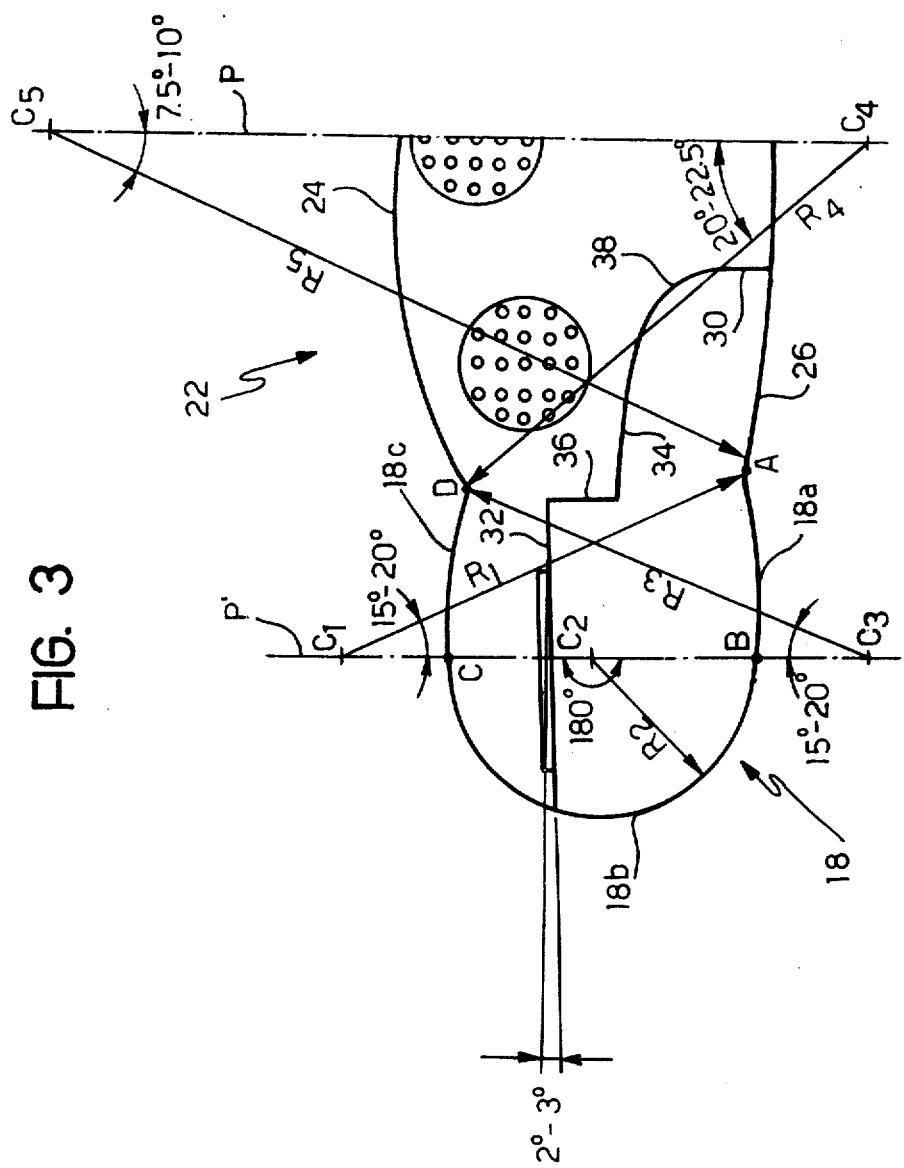
FIG. 3 is a geometrical scheme of the cross-sectional shape of the evaporator.

FIG. 2 shows that the evaporator is of a generally flat configuration, symmetrical with respect to a vertical longitudinal mid-plane P of the evaporator. Actually, the shell 10 forms a pair of lobes 18, 20 at opposite sides of plane P enclosing therebetween a spinal portion 22, the latter being defined by an upwardly arched top wall 24 and a downwardly arched bottom wall 26. The wall portions of the shell forming the lobes 18, 20 are each (in cross-sectional shape) a polycentric continuous curve. As shown in FIG. 3 with reference to lobe 18, the wall defining the lobe comprises a bottom wall section 18a, a lateral wall section 18b and a top wall section 18c regularly merging into each other and extending between generatrices represented by points A, B, C and D. The curve segments A-B, B-C and C-D are all circular arcs having their centres of curvature lying on a vertical longitudinal plane P' parallel to P. $C_1$, $C_2$ and $C_3$ are the curvature centres of arcs A-B, B-C and C-D, respectively, and $R_1$, $R_2$ and $R_3$ are the respective curvature radii of said arcs.

FIG. 3 also shows that the cross-sectional shape of the top wall 24 of the spinal portion is a circular arc of radius $R_4$ and curvature centre $C_4$, and the cross-sectional shape of the bottom wall 26 is a circular arc of radius $R_5$ and curvature centre $C_5$, these two centres being located on plane P. The polycentric curve is concave towards the spinal portion 22 and is connected by its branches to the circular arcs defining the walls 24, 26 of the spinal portion. The radius of curvature $R_5$ of the bottom wall 26 advantageously is four to six times as great as the radius $R_4$ of the top wall 24. The radii $R_1$ and $R_3$ are substantially equal to each other and, preferably, also equal to the radius $R_4$ of the top wall 24; at the same time, the ratio of each of the radii $R_1$, $R_3$ to the radius $R_2$ of wall section 18b (circular arc B-C) is from 2:1 to 2.5:1. The angles subtended by the various arcs are indicated directly on FIG. 3.

Since the shell is symmetrical with respect to the plane P, considerations identical to those made above in connection with the lobe 18 also obviously apply to the opposite lobe 20 (FIG. 2), the wall of which comprises wall sections 20a, 20b, 20c having their centres of curvature on plane P'', symmetrical to P'.

A pair of longitudinally extending hoods H1, H2 of sheet steel (FIG. 2) is provided in each of the distillation units, each of the hoods being sealingly welded to both the shell and partition walls thereby to subdivide the inside of the unit into a pair of evaporation chambers E1, E2 and a condensation chamber CC. It will be seen that each of the evaporation chambers extends (in transverse sense) across its respective lobe (18 or 20) and also across a part of the spinal portion 22. Each of the hoods H1, H2 comprises an upstanding side wall 30 welded to the bottom wall 26, and a stepped roof wall comprising an upper step 32, a lower step 34, and a substantially vertical riser portion 36 interconnecting the two steps. The lower step 34 slopes towards its corresponding side wall 30 by about 10° and merges into said wall 30 through a rounded wall portion 38. As shown in FIG. 3, the slope of the step 34 may progressively increase in direction towards the wall 30. The upper step 32 is substantially planar and slopes towards its corresponding lateral side of the shell 10 (i.e., towards wall portion 18b in the case of hood H1) at an angle of 2°-3° (FIG. 3). The upper step 32 is advantageously situated at about the mid-height of its corresponding lobe (18 or 20) or somewhat above the curvature centre $C_2$. Its longitudinal edge welded to the shell is formed with a series of notches, one of which is shown at 40 in FIG. 5. Each of the two upper steps 32 has a large aperture 42 formed therein which is covered by a filtering layer 44, such as a fibrous mat. The steam flashing off in the evaporation chambers E1, E2 passes freely through the filtering layers 44 while droplets of saline water entrained by the flow of steam are entrapped by the layers and drip back into the evaporation chambers. Any droplets not entrapped by the filtering layers fall onto the upper face of the step 32 and the thus collected film of saline water flows towards and through notches 40 back to the evaporation chamber.

The side walls 30 of the hoods H1, H2 are transversely spaced from each other thereby to form therebetween a distillate-collecting channel 46; the latter communicates in a manner known per se with means (not shown in the drawings) pumping the distillate to stockage tanks.

Saline water flows from a distillation unit to the next one through submerged passages 48 formed in partitions 16 in the regions surrounded by the lobes 18, 20 of the shell. A pair of further submerged passages 50 is advantageously formed in each partition at locations adjacent the opposite sides of the channel 46, at the confluence of the side walls 30 with the bottom wall 26. The depth of the saline water stream flowing through each evaporation chamber is determined by a dam 51 extending across its respective chamber and protruding upwardly from the bottom of the chamber through a height greater than the height of the passages 48, 50 in the partitions, so that, in operation, the passages are submerged and, consequently, a hydraulic lock is established between each pair of adjacent units D1, D2, . . ., allowing differing internal pressure values to be maintained in the units.

In the embodiment shown, each of the units comprises three condensers 52, 54, 56, located in an upper part of the spinal portion 22. Each of the condensers comprises a bundle of straight, mutually parallel heat-exchange tubes having their ends expanded in corresponding holes in a pair of circular head plates 58, 58a, as is known in the art. The condensers extend longitudinally of the evaporator and are arranged symmetrically with respect to the mid-plane P. More particularly, the condenser 52 is arranged centrally, i.e., has its longitudinal axis lying on plane P, while the condensers 54, 56 are arranged at opposite sides of plane P at a level lower than that of the condenser 52. It will be seen in FIGS. 2 and 3 that the riser 36 of each of the hoods H1, H2 is located substantially in the "throat" between the spiral portion 22 and the corresponding lobal portion 18, 20. This arrangement of the risers substantially contributes towards flexural strength of the evaporator and, at the same time, gives rise above the lower step 34 to a large space for accommodating directly above the step the respective condenser 54 or 56. Moreover, it will be seen in FIG. 2 that the flow of steam leaving the filters 44 is effectively guided towards the condensers by the wall portions 18c, 20c of the lobes 18, 20, so that the condensation takes place very quickly and evaporation in the chambers E1, E2 is speeded up. The condensate dripping from the condensers 54, 56 falls onto the inwardly sloping steps 34 and is collected in the channel 46; the condensate on the central condenser 52 drips directly into the channel.

The partitions 16 are each formed with three circular apertures corresponding to the three condensers. Thus, a rear head plate such as 58a of a condenser in one distillation unit may be sealingly connected with the front head plate such as 58 (FIG. 4) of the corresponding condenser in the next unit thereby to obtain a line of mutually aligned condensers extending throughout the length of the evaporator. In the embodiment shown, three lines of condensers are obtained in this manner.

In operation, saline water is continuously supplied to the lines of condensers at one end of the evaporator through conduits 60 (FIG. 4) and is warmed up in the condenser tubes by the condensation head subtracted by the condensers from the steam evolving in the distillation units of which the unit Dn operates at the lowest temperature and pressure while the unit Dl operates at the highest temperature and pressure. The flow of warmed up saline water leaves the condenser lines at the other end of the evaporator through conduits 62 and is supplied to the evaporation chambers in unit Dl after being brought in a heater 64 to the temperature programmed for the unit Dl. The saline water flows now through the series of units Dl . . . Dn through the passages 48, 50 in the partitions and is progressively concentrated; the distillate is recovered from channels 46 by the hereinbefore mentioned means not shown on the drawings, while the concentrated brine is discharged from the unit Dn through a conduit 66.

Depending upon the circumstances, the evaporator may also be operated with a single line of central condensers 52 only or, alternately, with the two lines of lateral condensers 54, 56, only. This possibility makes the evaporator very flexible in practice.

Also, if desired, the line of central condensers 52 may be omitted in designing the evaporator; or the lines of lateral condensers 54, 56 may be omitted and the central condenser 52 conveniently enlarged. However, these two alternatives must not be considered as preferred in comparison with the arrangement shown in the drawings.

An evaporator constructed and arranged in accordance with the practical embodiment described hereinbefore with reference to the drawings produces 2,500 cu.m/hr soft water of extremely high purity (conductance of 3–1 micro-Siemens/cm) with an installation cost which is far below the cost of known multistage flash-evaporators of similar productivity.

What we claim is:

1. In a multistage flash-evaporator for producing soft water from a saline water comprising: a horizontal, uninterrupted rectilinear tubular shell having a pair of transverse end walls; a plurality of longitudinally spaced transverse partition walls in the shell subdividing the inside of the latter into a series of consecutive distilling units; a longitudinally extending hood in each unit subdividing the inside of the unit into an evaporation chamber and a condensation chamber, said longitudinally extending hood including a filtering zone pervious to steam through which the evaporation chamber communicates with its associated condensation chamber in the unit; normally submerged passageways in each partition wall allowing a continuous flow of saline water through the evaporation chambers in the consecutive units; and a condenser in each unit comprising a rectilinear bundle of heat exchange tubes extending longitudinally in the condensation chamber; the cross-sectional shape of both the said shell and chambers being constant throughout the length of the shell and symmetrical with respect to a vertical longitudinal mid-plane of the evaporator, and the condensers in the distillation units being serially connected therebetween; the improvement comprising:

a — the said shell forming a pair of lobes at opposite sides of said longitudinal mid-plane enclosing therebetween a spinal portion defined by an upwardly arched top wall and a downwardly arched bottom wall;

b — the cross-sectional shape of both said top wall and said bottom wall being a circular arc having its centre of curvature on the said mid-plane;

c — the cross-sectional shape of each of said lobes consisting of a continuous polycentric curve which is concave towards the spinal portion and is connected by its branches to the respective circular arcs mentioned at (a);

d — a pair of said longitudinally extending hoods provided in each distillation unit at opposite sides of said mid-plane, each of the hoods comprising a roof wall which includes the aforementioned filtering zone and is located in its corresponding lobe and in an adjacent part of the spinal portion of the shell, and a side wall connecting the roof wall to the bottom wall of the spinal portion in an arrangement wherein said side walls of the hoods form therebetween a distillate-collecting channel extending longitudinally of the distilling unit between a pair of evaporating chambers underlying their respective hoods;

e — the said normally submerged passageways in each of the partition walls located in regions surrounded by the respective lobes of the shell.

2. A multistage flash-evaporator as claimed in claim 1, wherein each of the polycentric curves mentioned at (c) consists of three segments having their centres of curvature located on a vertical plane parallel to the said mid-plane, and wherein the curvature of the top wall of the spinal portion is greater than the curvature of the bottom wall of said portion.

3. A multistage flash-evaporator as claimed in claim 2, wherein: the radii of curvature of the two lobal upper and lower segments of each of the polycentric curves are substantially equal to each other; the ratio of each of these radii to the radius of curvature of the terminal segment of the curve is from 2:1 to 2.5:1; the radius of curvature of the bottom wall of the spinal portion is at least 4 times as great as the radius of curvature of the top wall of the spinal portion while the latter radius is substantially equal to the radii of curvature of said two lobal segments; and wherein: the angle subtended by the said terminal segment is substantially 180°; the angle subtended by each of the two said lobal segments is from about 15° to about 20°; the angle subtended by the top wall of the spinal portion is from about 40° to about 45°; and the angle subtended by the bottom wall of the spinal portion is from about 15° to about 20°.

4. A multistage flash-evaporator as claimed in claim 1, wherein the roof wall in each of the hoods merges with the respective side wall of the hood through an arcuate wall portion, and the roof wall portion including the filtering zone slopes towards its corresponding lobal side of the evaporator at an angle of 2°–3°.

5. A multistage flash-evaporator as claimed in claim 4, wherein the said roof wall comprises an upper step including said filtering zone, and a lower step which merges with said side wall and slopes towards the latter at an angle of at least 2°–3°.

6. A multistage flash-evaporator as claimed in claim 1, wherein each of the distillation units comprises from one to three condensers located in an upper part of the spinal portion symmetrically with respect to the said vertical longitudinal mid-plane.

7. A multistage flash-evaporator as claimed in claim 6, wherein three condensers are provided comprising a central condenser located on the mid-plane and two further condensers located at opposite sides of the mid-plane at a level lower than the central condenser.

8. A multistage flash-evaporator as claimed in claim 5 wherein the condensers present comprise two condensers located directly above the lower steps of the roof walls of the respective hoods.

9. A multistage flash-evaporator as claimed in claim 1, comprising a dam extending transversely on the bottom of each evaporation chamber through a height greater than the height of the passageways in the partition walls.

* * * * *

UNITED STATES PATENT AND TRADEMARK OFFICE
CERTIFICATE OF CORRECTION

PATENT NO. : 3,933,597
DATED : January 20, 1976
INVENTOR(S) : Diego Barba, et al It is certified that error appears in the above-identified patent and that said Letters Patent are hereby corrected as shown below:

[30] Foreign Priority Data

Italian No. 32348-A/73 of December 28, 1973

Signed and Sealed this eleventh Day of May 1976

[SEAL]

Attest:

RUTH C. MASON
Attesting Officer

C. MARSHALL DANN
Commissioner of Patents and Trademarks